United States Patent [19]
Hejmanowski

[11] 3,921,786
[45] Nov. 25, 1975

[54] CONVEYER SORTER APPARATUS
[75] Inventor: Henry P. Hejmanowski, Steger, Ill.
[73] Assignee: A W & H Manufacturing Co., Inc., Worth, Ill.
[22] Filed: Mar. 11, 1974
[21] Appl. No.: 449,681

Related U.S. Application Data
[63] Continuation of Ser. No. 147,482, May 27, 1971, abandoned.

[52] U.S. Cl................. 198/38; 198/21; 198/127 R; 198/185
[51] Int. Cl.² ........................................ B65G 47/42
[58] Field of Search.... 198/20 R, 21, 24, 38, 127 R, 198/185, 25, 212

[56] References Cited
UNITED STATES PATENTS

| | | | |
|---|---|---|---|
| 1,909,481 | 5/1933 | Allen | 198/20 R |
| 2,002,830 | 5/1935 | Pevear | 198/127 R |
| 3,034,634 | 5/1962 | Brand | 198/38 |
| 3,126,086 | 3/1964 | Holben | 198/24 |
| 3,139,965 | 7/1964 | Eggert | 198/31 AC |
| 3,198,308 | 8/1965 | Driesch | 198/24 |

Primary Examiner—Evon C. Blunk
Assistant Examiner—Jeffrey V. Nase
Attorney, Agent, or Firm—Roy E. Petherbridge; Robert L. Lindgren; Edward D. Gilhooly

[57] ABSTRACT

Apparatus for sorting and directing various items of diverse shape, size and weight from a point of origin to a delivery station. The sorting apparatus includes a conveyer having a diverting arm associated therewith which is actuated in response to items moving along the conveyer belt and sensed at a sensing station to actuate movement of the diverter arm at the appropriate time for intercepting the article moving along the conveyer and diverting the article to a holding area or delivery station. The diverting arm is formed in a tapered wedge configuration providing high strength and light weight. The movement of the diverter arm is continuous to sweep across the conveyer and return to its original position out of the path of travel of the conveyer belt through operation of a unidirectionally operated motor which eliminates the need for reversal of the motor to return the diverter arm from the intercept position.

10 Claims, 8 Drawing Figures

U.S. Patent  Nov. 25, 1975  Sheet 1 of 3  3,921,786
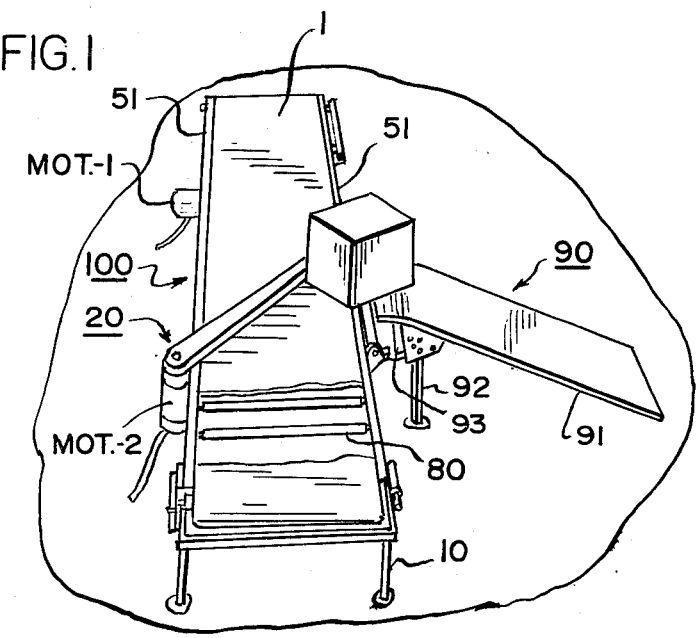
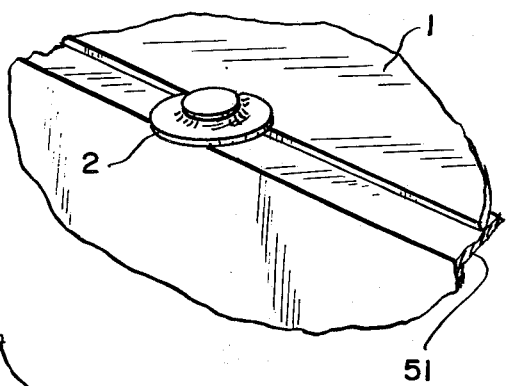
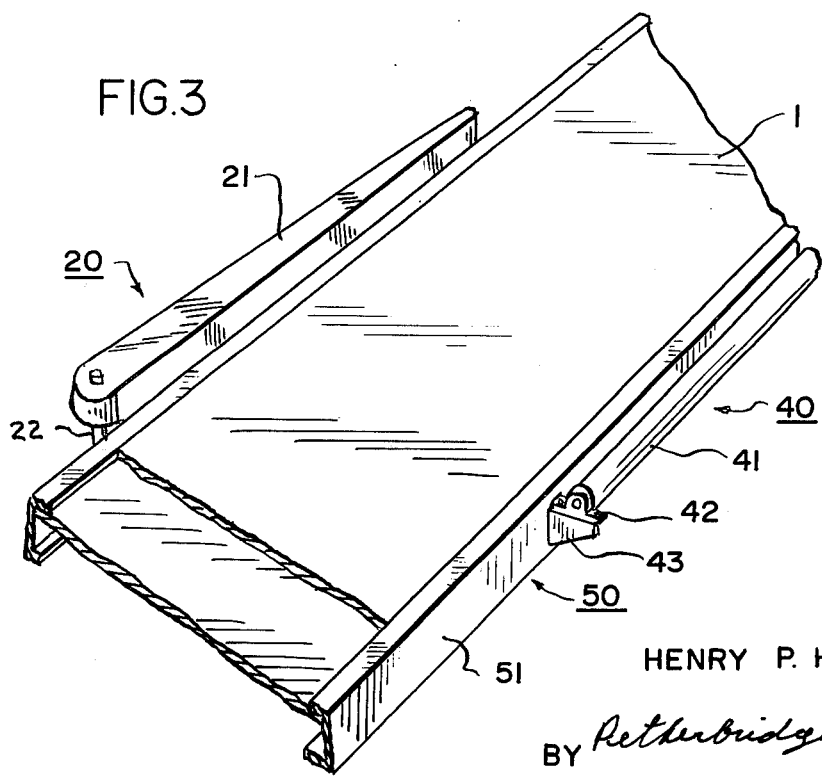
INVENTOR
HENRY P. HEJMANOWSKI
BY Retherbridge, O'Neill & Lindgren
ATTORNEYS.

U.S. Patent  Nov. 25, 1975  Sheet 3 of 3  3,921,786
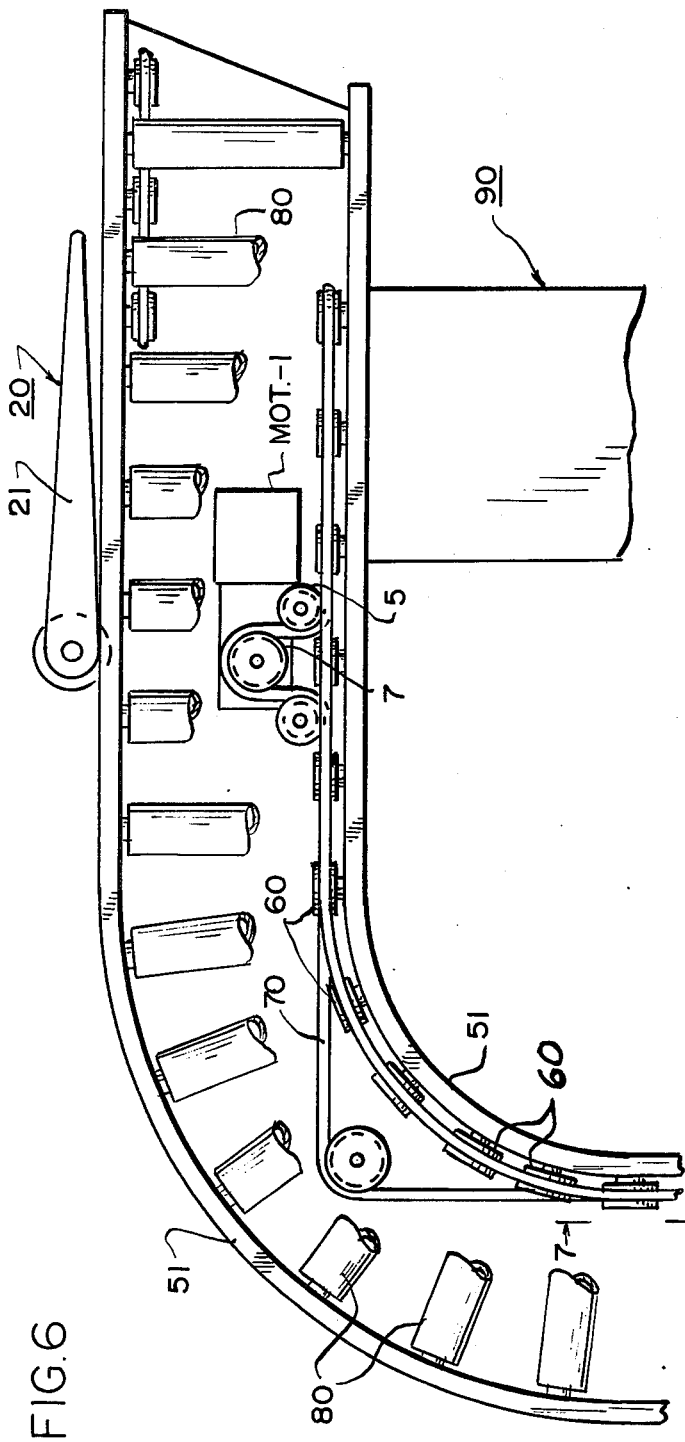
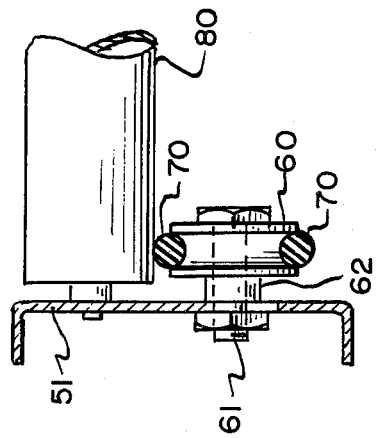
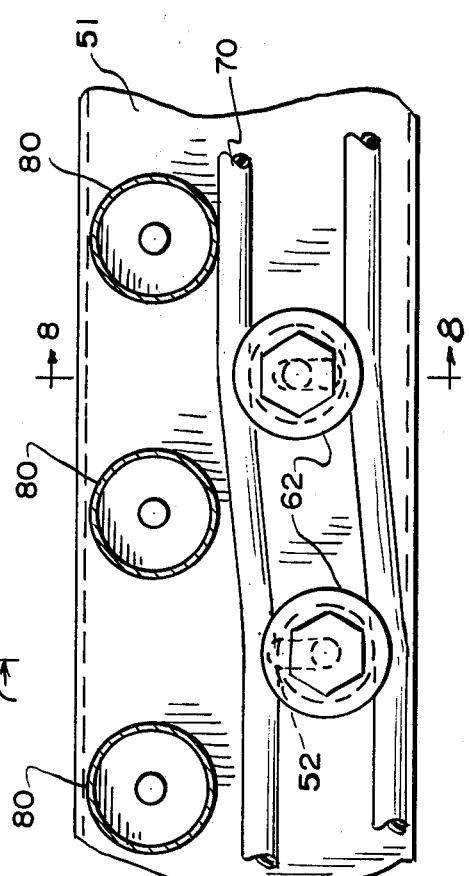
INVENTOR
HENRY P. HEJMANOWSKI
BY Petherbridge, O'Neill & Lindgren
ATTORNEYS

CONVEYER SORTER APPARATUS

This is a continuation, of application Ser. No. 147,482, filed May 27, 1971, and now abandoned.

BACKGROUND OF THE INVENTION

This invention relates in general to conveyer sorting and, in particular, to an apparatus actuated in response to the movement of items along a conveyer belt for diverting the items to a delivery station or holding area.

More specifically, this invention relates to a sorter apparatus having a tapered diverting arm operable in a continuous sweeping motion resulting in the acceleration and deceleration of the diverter arm as it moves across the conveyer thereby turning the intercepted article smoothly from the direction of conveyer travel to the direction for delivery.

SUMMARY OF THE INVENTION

It is, therefore, an object of this invention to improve conveyer sorter apparatus.

Another object of this invention is to improve intercepting and diverting apparatus for use with a conveyer to direct articles therealong to a delivery station or holding area.

A further object of this invention is to intercept and divert articles passing along a conveyer to a delivery station or holding area in a ccontinuous flowing movement.

Still another object of this invention is to intercept and register articles moving on a conveyer belt and divert the articles therefrom without necessitating stopping the belt or exerting substantial forces in a direction transverse of the conveyer belt path of travel.

These and other objects are attained in accordance with the present invention wherein there is provided a conveyer apparatus having a diverting station for intercepting pre-selected items moving along the conveyer belt path of travel and diverting the pre-selected items therefrom to a delivery station or holding area in a continuous direction of flow. The diverting arm is formed as a tapered wedge and is operable from a position out of interference with the path of belt travel to an intercept position in a continuous reciprocal motion uniformly accelerating and decelerating the diverting arm movement.

DESCRIPTION OF THE DRAWINGS

Further objects of the invention, together with additional features contributing thereto and advantages accrueing therefrom, will be apparent from the following description of one embodiment of the invention when read in conjunction with the accompanying drawings, wherein:

FIG. 1 is a perspective view of the invention showing a belt on roller bed conveyer, diverting arm, and a diverting station with an article being diverted from the conveyer.

FIG. 3 is a perspective view of a belt on slider bed conveyer apparatus with the diverter arm in its non-intercept or out-of-interference position with portions broken away to better illustrate the components thereof;

FIG. 4 is an enlarged view of a conveyer belt guide to inhibit lateral movement of the conveyer belt during diverting movement of an article from the conveyer;

FIG. 6 is a horizontal elevation of a live roller conveyer apparatus and diverting mechanism to better illustrate the conveyer drive mechanism;

FIG. 7 is an enlarged partial section of the apparatus shown in FIG. 6 taken along lines 7—7; and FIG. 8 is an enlarged partial section of the apparatus shown in FIG. 6 taken along lines 8—8.

DESCRIPTION OF A PREFERRED EMBODIMENT

Figure 5:
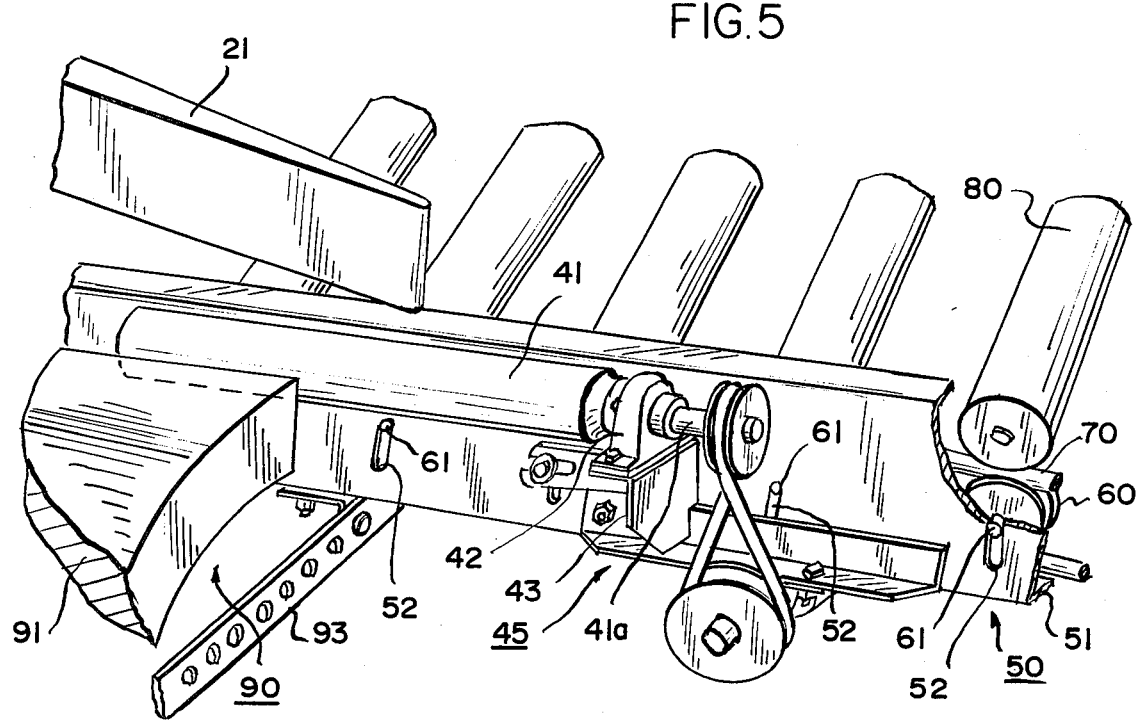
FIG. 5 is a frontal perspective view of a live roller conveyer with a diverting station to better illustrate an alternative embodiment using a power-driven side roller.

Referring now to FIG. 1, the sorter apparatus includes a conveyer 100 having a diverting apparatus 20 normally positioned out of interence with objects moving along the conveyer and actuable to divert an object to a delivery station or holding area 90 in response to the actuation of a sensor 29 positioned to detect objects moving along the conveyer belt path of travel. The conveyer 100 includes an open frame having legs 10 supporting a roller frame 50. The roller frame 50 includes a pair of transversely spaced side channels 51 having journaled along the inner face thereof a plurality of spaced sheaves 60 carrying a drive belt 70.

The drive belt 70 is a urethane elastomer material formed in a substantially circular cross-section by molding or casting a liquid polyurethane, either polyether or polyester, to which a curing agent or other additives have been added to impart resilient characteristics. Such a suitable material is available from the Elastomer Chemicals Department of the E. I. DuPont de Nemours & Company, Inc., Wilmington, Del. The drive belt 70 formed of this material is characterized by its complete resiliency within its elastic limit when subjected to any deforming force whether applied transversely or axially of the drive belt. In addition, the drive belt is homogeneous throughout its cross-section and, therefore, the outer surface will retain a high coefficient of friction regardless of belt wear, and is resistant to oil or solvent deterioration.

The drive belt 70 is distinct from the most commercially accepted drive belt, the V-belt, which is substantially trapezoidal in cross-section and may be turned or bent only a limited amount in any direction transverse to the longitudinal axis of the belt without causing a rapid failure of the material. The V-belt's cross-section is necessary to provide a suitable drive engagement with the adjustable sheaves 60 while maintaining line contact with the carrier rollers 80 and the upper surface of the drive belt. This line contact is necessary in attempting to control the drive force transmitted from the belt to the carrier rollers.

V-belts, and flat belts, are generally made from rubber reinforced internally with a woven fabric laminae and provided with an exterior woven fabric embedded in the base material. The interior laminated reinforcement and exterior fabric covering increase the wearability and impart the required strength characteristics to the belt. However, it is well known that the fabric surface readily wears so that friction decreases altering the driving force transmitted by the belt and requiring frequent adjustment of the sheaves to maintain the force desired in the carrier rollers. In addition, these belts are subject to deterioration and aging such that they lose their resiliency or simply fail.

In addition, due to the complexity of forming a flat or V-belt in an endless length, the manufacturers supply these belts to "standard" length. However, when a conveyer unit is being fabricated for a particular application, the application generally requires a belt which is not of a "standard" length and, therefore, in order to compensate for excess belt length and impart the necessary driving tension to the belt it is necessary to use take-up devices of various types which are well known in the art. This use of take-up devices substantially increases unit cost of the conveyer apparatus.

A further limitation to the flat or V-belt is found in forming curves removed from the belt run plane. It is exceedingly difficult to effect a drive between pulleys or sheaves which are arranged with their respective axes of rotation located at right angles to each other Under this condition, the V-belt or flat belt resists twisting becoming disconnected from the driving engagement with the pulleys or if retained thereon will fail. Therefore, to prevent these occurences the V-belt or flat belt drive systems require that the pulleys or sheaves be arranged such that their respective axes of rotation lie in parallel planes. Such a design necessitates utilization of excessive space which could be used for other equipment, increases the size required for a conveyer system and results in a lower efficiency for the unit. However, while the type of drive belt 70 disclosed herein is preferred, a flat or V-belt can be used.

Carrier rollers 80 which are driven by drive belt 70 are rotatably journaled along the inner face of the side channels 51 and positioned above the sheaves 60 with the drive belt 70 passing therebetween. The carrier rollers may be positioned between adjacent sheaves or diametrically opposite thereto.

To control the driving force transmitted from the drive belt 70 to the carrier rollers 80, the sheaves are vertically adjustable in the side channel 51 as best shown in FIG. 3. Each of the sheaves 60 is rotatably supported on a stub shaft 61 carried by the side channel 51, spaced therefrom by suitable spacers 62, and secured thereto to permit vertical positioning of the stub shaft in a slot 52 formed in the side channel. The vertical positioning of the sheaves 60 in relation to the carrier rollers 80 provides a precise control of the driving force transmitted to the carrier rollers 80 and conveyer belt 1 by the drive belt 70.

A drive motor MOT-1 having a drive pulley 7 is fixedly mounted between the side channels 51 by appropriate brackets with the drive pulley lying in a plane parallel to the conveying surface formed by the conveyer belt 1 and carrier rollers 80. The motor and drive pulleys are positioned in this manner with the drive pulley lying in a plane perpendicular to the run of the drive belt to conserve space and minimize the depth of the conveyer apparatus. A pair of snubber pulleys 5 are carried by one of the side channels 51 in a position adjacent the belt run to guide the drive belt 70 about the drive pulleys 7 thereby providing a sufficient amount of wrap thereabout to transmit the drive force from the motor to the drive belt.

The drive belt 70 is of a length such that in an unstressed condition it is shorter than when constrained about the motor or power transfer pulley 7, the snubber pulleys 5, and each of the sheaves 60. The resiliency or elasticity of the material is sufficient to maintain the drive belt in its configuration without necessitating the use of take-up devices. Through the vertical adjustment of the sheaves 60, the drive pulley 70 may be positioned to impart any desired driving force to the carrier rollers. The substantial circular cross-section of the drive belt 70, permits such an extremely accurate adjustment by varying the substantially point contact of the belt 70 with the carrier rollers 80.

Due to the relatively high coefficient of friction of the urethane elastomer, this control can be precisely regulated with a minimum of contact between the drive belt 70 and the carrier rollers 80. Thereby, the accumulative pressure exerted by material moving on the driven carrier rollers may be precisely adjusted so that no derailment or damage results to the material. In this manner articles serially passing on the carrier rollers may be intercepted or accumulated.

In addition due to the nature of the drive belt 70, the length required for drive belt 70 is exactly determined for each individual conveyer installation. The total length of the drive belt required to pass about the sheaves 60, run length, is measured and the length of the drive belt is cut a predetermined percentage less than the length required for the belt run, the particular percentage being dependent upon its corresponding application. Preferably, the drive belt 70 is then passed about the sheaves 60, snubber pulleys 5 and drive pulley 7 and the two ends stressed until they meet, the prestressing of the belt being determined by the portion removed from the run length.

The two ends of the drive belt may be joined at the site of the conveyer installation by merely heating the two ends to a semi-fluid or adhesive state and manually pressing them together until cool. In this manner the desired amount of tension may be maintained in the system to transmit the driving force from the motor pulley to the drive belt without necessitating the use of any take-up devices. While it is preferable to stretch or stress the drive belt after it has been entrained on the sheaves, it is obvious that the ends of the drive belt may be joined prior to placing the drive belt into the conveyer apparatus. Also, the amount of stressing or stretching of the belt will vary with the diameter thereof and the particular conveyer application.

To intercept articles passing along the conveyer 100, the diverting mechanism 20 includes a tapered wedge-shaped arm 21 formed of a light weight high strength material which is secured to a shaft 22 forming part of an eccentric drive system coupling the output or drive shaft of diverter motor MOT-2 (carried by frame 50) through the shaft 22, to oscillate the diverter arm 21 into and out from interference with the path of travel of the conveyer belt 1 or objects passing thereon. The eccentric drive system is of a type such that the continuous unidirectional rotation of the output shaft of motor MOT-2 is translated to oscillatory rotational movement of the shaft 22 resulting in the oscillatory movement of the diverter arm across the path of travel of the conveyer belt 1 without necessitating reversing the direction of rotation of the motor MOT-2.

Figure 2:
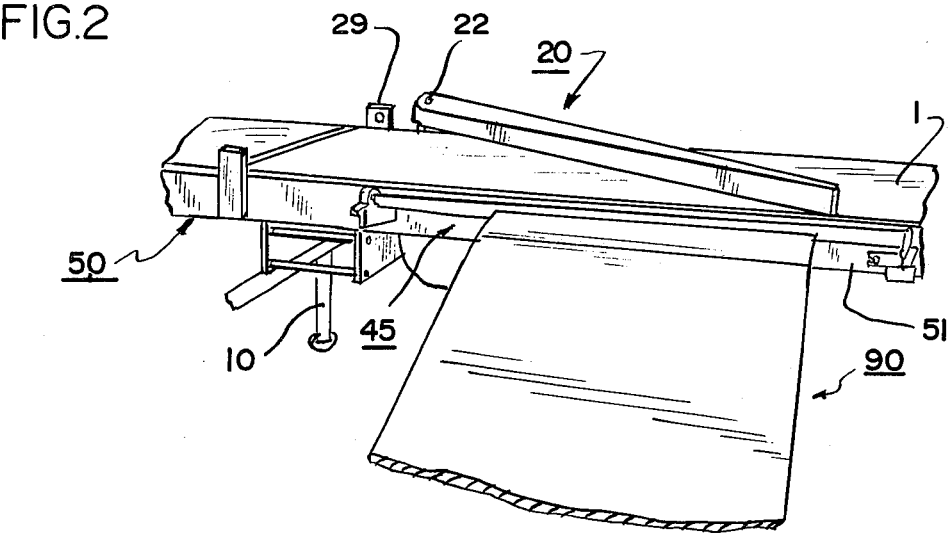
FIG. 2 is a frontal perspective view of the diverting station on a belt on slider bed conveyer with the diverter arm in its intercept position and a sensing station operable to actuate the diverter.

The movement of the diverter arm 21, to remove an object passing along the conveyer belt 1 to a delivery station or holding area 90, is controlled by a sensing apparatus 29 comprising a photosensor and light source. When the sensing apparatus 29 is actuated (in a manner to be hereinafter described), upon the interruption of the light beam from the light source passing across the conveyer belt 1 into the photosensor — by the passage of an object therebetween — the diverting mechanism will be energized to pivot from its position (FIG. 3) out of the path of conveyer belt travel to intercept (FIGS. 1 and 2) the article passing along the belt surface to push the article off the conveyer belt to the delivery station or holding area 90. While the delivery station or holding area 90 is illustrated as a ramp 91 supported on legs 92 and secured to the conveyer by brackets 93, additional conveyers or other apparatus can be used.

The movement of the diverting arm 21 pushes the article from the surface of the conveyer belt, as opposed to functioning merely as a guide relying on the belt travel to remove the article from the belt surface. The pushing function of the diverting arm permits an item passing on the conveyer belt to be turned in the direction of flow (shown in FIG. 1) and, therefore, the same orientation of the article is maintained throughout its entire conveyance. In this manner, appropriate indicia to automatically sense the delivery station or holding area to which the item may be destined, can read the item without having to provide such indicia on various faces of the item or require additional apparatus to re-orient the item once it has had its initial direction of movement changed.

In operation, when an item is placed on the conveyer belt, a suitable encoder is actuated to activate the sensing apparatus 29 positioned on each side of the conveyer belt. When sensing apparatus 29 is activated, an item moving therethrough on the conveyer belt 1 will cause the diverting mechanism to remove the article at its appropriate delivery station or holding area 90. Although, for convenience of illustration only one diverting station is shown, usually a number of such stations are utilized and the encoder controls the activation of the sensing apparatus 29 to insure that an item is delivered at its appropriate delivery station or holding area. However, a single diverting station may be utilized and its sensing apparatus programmed to remove any number or combination of pre-selected items. In addition, the article itself may be provided with a coded indicia which is read to control the energization of the sensing apparatus 29 to remove the article from the path of travel of the conveyer belt 1. A suitable control system for actuating the diverter mechanism 20 is disclosed in E. T. Kantarian et al, U.S. Pat. No. 3,511,372, entitled "Article Handling Means, Systems, and Devices" and reference is made thereto for the system disclosed therein.

In certain preferred applications, such as when utilizing a belt on roller bed or belt on slider bed type conveyer, the sensor apparatus 29 can be eliminated and its function retained by an encoder at the input to the conveying system. An analog encoder, a suitable analog memory system being on Ebbert ball memory system available from Ebbert Engineering, Troy, Michigan, can be used at the input station to program the diverting mechanism 20 for actuation in response to the position of an article on the conveyer belt 1. The ball memory system is correlated to the speed of the conveyer belt 1 such that an input indicative of the leading edge of an item is programmed to actuate a given diverter mechanism 20 based upon the position of the item as it is carried upon the belt.

In operation, articles are positioned along the edge of the conveyer apparatus 100 on the side thereof adjacent the pivot of the diverter mechanism 20. The activation of the diverter mechanism 20 is then programmed to be activated, by the sensor 29 or the input station, such that the leading forward edge of the articles will contact the diverter arm at a predetermined point along its length to insure that the smallest article in the run will be completely swept from the conveyer belt 1 to the delivery station 90.

As shown in FIG. 4, a belt guide is positioned along the edge of the conveyer belt 1 to prevent lateral movement of the belt along its path of travel, especially when the diverting mechanism 22 is removing an item from the belt surface. The belt guide 2, as best shown in FIG. 4, is formed with modified hemispherical top and rotates in the direction of the belt travel so that it does not impede the progress, speed or direction of an item that may come into contact therewith.

The conveyer belt 1 is preferred to be of nylon having low friction and good wear characteristics. Therefore, when the arm 21 strikes an item pushing the item from the belt surface a minimum amount of force directed transverse to the normal belt path of travel is exerted on the belt. This pushing of the article off the conveyer belt surface, as opposed to the prior art mechanisms which guide an object off the belt surface and, therefore, rely on the belt movement to remove the item from the surface thereof, applies a force to the object itself sweeping the object off the belt and minimizing transmission of the lateral force to the belt. In this manner, the article is positively removed from the belt surface without occasioning creeping, sliding, or otherwise continuing forward motion of the item as found in systems utilizing a guide to remove the object from the conveyer belt. Furthermore, the physical action of the diverting arm 21 sweeping the item from the belt surface allows the article moving on the belt to be registered, positioned, and turned in a continuous path of travel in a uniform line of flow maintaining the original orientation of each item as it is intercepted on the conveyer and propelled in an established direction. The acceleration-deceleration of the diverter arm due to the drive mechanism coupling shaft 22 to the drive motor MOT-2 allows the item moving on the belt surface to be intercepted by the arm, and the variations in the arm velocity during this positive and negative acceleration registers the item and then removes the item to the delivery station or holding area at an increasing velocity.

As shown in FIG. 5, an auxiliary roller system 40 may be used at the delivery station or holding area 90 to further assist in forwarding items in the direction which they are propelled by the diverter arm 21. The roller system comprises a roller 41, which may be gravity operated, driven through a power take-off drive system 45 coupled to the drive system of the carrier rollers, or driven by an independent electric motor. The roller 41 is positioned with its longitudinal axis parallel to the path of travel of the conveyer belt 1, and suitably journaled in bearings 42 with its top most surface below the path of travel of the diverter arm 21. The bearings 42 are carried by brackets 43 fixed to the roller frame 50 with a portion of the roller shaft (41a) extending outward from the roller for engagement with the drive mechansim 45 when a power take-off or independent motor drive is employed. The auxiliary roller system facilitates forwarding items in a direction in which they have been propelled by the diverter arm 21 pushing the article off the surface of the conveyer belt 1 to the delivery station 90.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that this invention not be limited to the particular embodiment disclosed as the best mode contemplated for carrying out this invention, but that it will include all embodiments falling within the scope of the appended claims.

What is claimed is:

1. A conveyor apparatus for transporting articles to predetermined delivery stations comprising:
    transport means having an upper surface for supporting and moving an article in a path of movement; and
    intercept means including a tapered wedge-shape diverting member pivoted at one end adjacent said transport means with the free end thereof actuable in a path of movement parallel to the upper surface of said transport means to sweep an article moving in said path of movement therefrom in a continuous flowing path of movement, and
    actuating means coupled to said diverting member for selectively sweeping the diverting member in a unidirectional rotation of a substantially 360° arcuate path about the pivoted end from an initial position out of the path of movement of the transport means along the direction of travel of said transport means to a position to sweep an article and returning to said initial position in a continuous movement.

2. The apparatus of claim 1 wherein an article moving on said transport means in a path of movement maintains a constant orientation upon being swept therefrom in a continuous flowing path of movement by said intercept means.

3. The apparatus of claim 1 further including an auxiliary roller positioned adjacent to said intercept means and having its axis of rotation transverse of the path of movement of an article swept from said transport means to facilitate continuous movement of the article.

4. The apparatus of claim 3 wherein said auxiliary roller is positively driven.

5. The apparatus of claim 1 further including sensing means responsive to the movement of an article in said path of movement to actuate said intercept means for sweeping the article therefrom.

6. The apparatus of claim 1 further including rotatable belt guide means positioned adjacent said transport means path of movement for preventing lateral movement of said transport means.

7. The apparatus of claim 1 wherein said transport means comprise a roller conveyer including
    a pair of parallel spaced frame members,
    a plurality of carrier rollers carried by said frame members and extending transversely therebetween,
    a plurality of spaced sheaves supported by one of said frame members,
    adjustable mounting means carrying said sheaves for vertical positioning relative to said member,
    a drive motor having a drive pulley, and
    an endless drive belt carried by said drive pulley and said sheaves in constrained contact therewith and operatively connected for driving engagement of said carrier rollers in response to the vertical positioning of said sheaves relative to said frame member,
    said drive belt having a greater length when constrained in contact with said drive pulley and said sheaves than when not stressed thereabout.

8. The apparatus of claim 7 wherein said drive belt is carried by said sheaves in substantially point contact with said carrier rollers.

9. The apparatus of claim 7 wherein said drive belt comprises a urethane elastomer.

10. The apparatus of claim 9 wherein said drive belt has a substantially homogeneous circular cross-section with a hard abrasive resistant surface having a high coefficient of friction.

* * * * *